United States Patent
Alexander

(10) Patent No.: US 9,985,744 B2
(45) Date of Patent: May 29, 2018

(54) WIRELESS RECEIVER

(71) Applicant: Cohda Wireless Pty Ltd., North Adelaide (AU)

(72) Inventor: Paul Dean Alexander, North Adelaide (AU)

(73) Assignee: Cohda Wireless Pty Ltd., North Adelaide (AU)

( * ) Notice: Subject to any disclaimer, the term of this patent is extended or adjusted under 35 U.S.C. 154(b) by 0 days. days.

(21) Appl. No.: 15/219,962

(22) Filed: Jul. 26, 2016

(65) Prior Publication Data

US 2017/0033891 A1 Feb. 2, 2017

(30) Foreign Application Priority Data

Jul. 30, 2015 (AU) ................ 2015903025

(51) Int. Cl.
*H03D 1/00* (2006.01)
*H04L 27/06* (2006.01)
*H04L 1/00* (2006.01)
*H04L 29/06* (2006.01)
*H04W 88/06* (2009.01)
*H04W 80/00* (2009.01)
*H04W 84/12* (2009.01)

(52) U.S. Cl.
CPC ............ *H04L 1/0036* (2013.01); *H04L 69/03* (2013.01); *H04L 69/18* (2013.01); *H04W 88/06* (2013.01); *H04W 80/00* (2013.01); *H04W 84/12* (2013.01)

(58) Field of Classification Search
CPC ..... H04W 80/00; H04W 88/12; H04W 88/06; H04L 69/18; H04L 69/03
See application file for complete search history.

(56) References Cited

U.S. PATENT DOCUMENTS

2003/0067999 A1* 4/2003 Echavarri ............... H04L 7/042
375/343
2016/0050692 A1* 2/2016 Azizi ................ H04W 74/0816
370/329

* cited by examiner

*Primary Examiner* — Shuwang Liu
*Assistant Examiner* — Sung Ahn
(74) *Attorney, Agent, or Firm* — Schwegman Lundberg & Woessner, P.A.

(57) ABSTRACT

Described herein is a wireless receiver configured to receive wireless signals containing data packets transmitted according to an undetermined communications protocol selected from at least a first communications protocol and a second communications protocol. Without necessarily decoding the data packets, for example according to either the first or the second communication protocol, the described wireless receiver is able to concurrently detect presence of signal transmission in the first communications protocol or the second communications protocol. In some arrangements, the described wireless receiver may be configured to differentiate between the first communications protocol and the second communications protocol. The ability of the wireless receiver to detect presence of signal transmission by other wireless devices may provide intelligence to an associated wireless transmitter of any concurrent signal transmission so as to minimize interference.

18 Claims, 16 Drawing Sheets

| Channel # | 172 | 174 | 176 | 178 | 180 | 182 | 184 |
|---|---|---|---|---|---|---|---|
| Freq (MHz) | 5860 | 5870 | 5880 | 5890 | 5900 | 5910 | 5920 |
| ETSI | ITS G5B (Non-Safety) | | | ITS-G5A (Safety) | | ITS-G5 D (Future) | |
| | SCH | SCH | SCH | SCH | CCH | SCH | SCH |
| IEEE | Safety | SCH | SCH | CCH | SCH | SCH | SCH |

Figure 1A

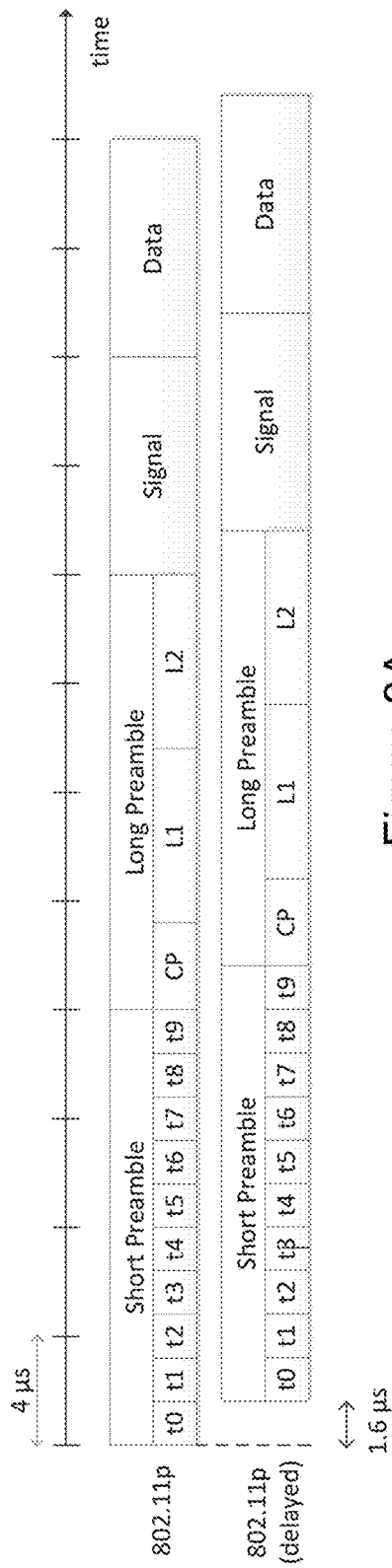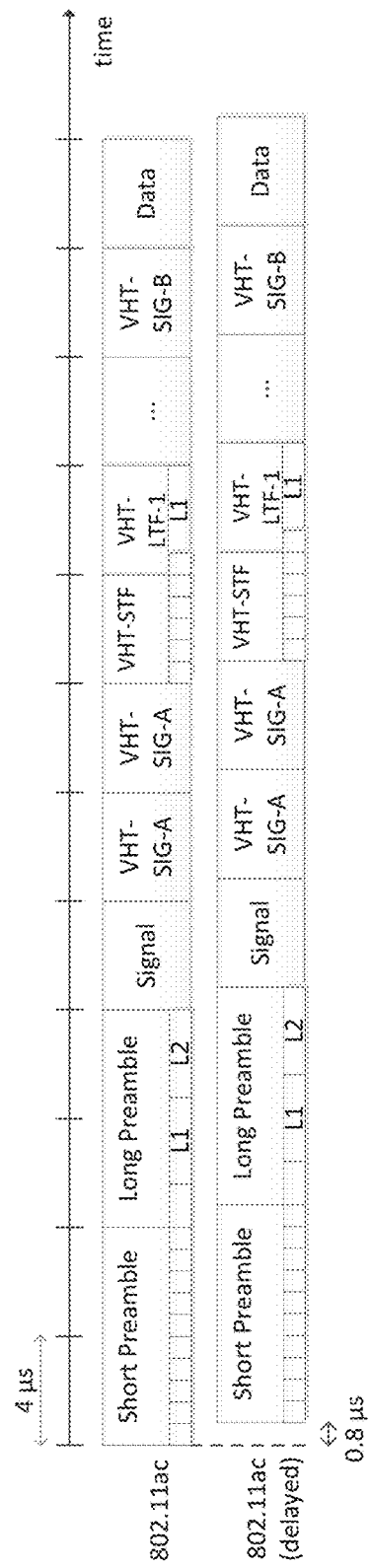
Figure 3A
Figure 3B

WIRELESS RECEIVER

CLAIM OF PRIORITY

This application claims the benefit of priority of Australia Patent Application No. 2015903025, filed on Jul. 30, 2015, the benefit of priority of which is claimed hereby, and which is incorporated by reference herein in its entirety.

FIELD OF THE INVENTION

The present invention relates to a wireless communications receiver and, in particular, a wireless communications receiver configured to operate in multi-protocol environments.

BACKGROUND OF THE INVENTION

In wireless communications, spectral resources are shared among wireless communications devices communicating with other devices potentially at the same time. To minimise radio interference, a wireless communications device may be prevented from transmitting in a particular frequency channel if transmission by another wireless communications device in the same frequency channel is detected to be currently taking place. One such scheme to minimise interference is known as dynamic frequency selection, in which a wireless device is configured to detect wireless transmission protected from interference.

Further, wireless signals of different communications protocols can be standardised for transmission in the same or overlapping frequency bands. For example, the emerging IEEE 802.11ac protocol for wireless local area networking and the IEEE 802.11p protocol for vehicular environments are both designed to operate in a radio spectrum near the 5 GHz frequency bands. However, wireless communications devices designed to operate according to one protocol may not necessarily be sensitive to wireless signals of another protocol. Even if a device is designed to operate according to multiple protocols, it may be necessary to switch operation between the multiple protocols to detect presence of signal transmission in a particular protocol. Switching between protocols however leads to a blackout period in which the device is sensitive only to signal transmission in one protocol and becomes unable to detect signals of any other protocols at any one time.

It would therefore be beneficial if a wireless communications device is able to detect presence of any concurrent signal transmission in a protocol other than the protocol in which the device is designed to communicate, while maintaining uninterrupted operation in the protocol for which the device is designed.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE INVENTION

According to a first aspect of the disclosure, there is provided a method of operating a wireless receiver configured to:

receive wireless signals of a first protocol designed for communicating data packets having a first preamble period; and receive wireless signals of a second protocol designed for communicating data packets having a second preamble period which is N times the first preamble period, where N is a positive integer, the method comprising the steps of:

receiving a wireless signal of an undetermined protocol, the wireless signal carrying a data packet;

generating a first time-shifted data packet with respect to the received data packet by a first time shift equal to M times the second preamble period, where M is a non-zero integer;

determining a first correlation metric based on the received data packet and the first time-shifted data packet, and determining the undetermined protocol as belonging to a set of protocols, including the first protocol and the second protocol, based on the first correlation metric.

Determining the undetermined protocol as belonging to a set of protocols may include the step of determining whether the first correlation metric satisfies a first criterion.

Determining the undetermined protocol as belonging to a set of protocols may include the step of determining whether the undetermined protocol is the first protocol or the second protocol. Determining whether the undetermined protocol is the first protocol or is the second protocol may be based on spectral information of the received wireless signal. The spectral information may be obtained by transforming the received data packet into a spectral domain.

Alternatively, determining whether the undetermined protocol is the first protocol or is the second protocol may include the steps of:

generating a second time-shifted data packet with respect to the received packet by a second time shift equal to Q times the first preamble period, where Q is a non-zero integer and is not an integer multiple of N;

determining a second correlation metric based on the received data packet and the second time-shifted data packet; and determining whether the undetermined protocol is the first protocol or the second protocol based on the second correlation metric.

In one example, Q is 1.

The step of determining based on the second correlation metric may include the step of determining whether the second correlation metric satisfies a second criterion.

Alternatively the step of determining based on the second correlation metric may include the step of determining whether the second correlation metric includes a plateau section.

In one example, the first protocol may be IEEE 802.11a or IEEE 802.11ac, and the second protocol may be IEEE 802.11p, wherein N is 2, and wherein the first preamble period is 0.8 μs and the second preamble period is 1.6 μs.

In one example, M is 1, wherein the first time shift is 1.6 μs, and the second time shift is 0.8 μs.

The step of determining the first correlation metric may include using a correlation length between the received data packet and the time-shifted data packet equal to a full preamble length of the data packet having a first preamble period minus M times the second preamble period.

The method may further comprises the step of causing a wireless transmitter to cease or be prevented from transmission.

According to a second aspect of the disclosure, there is provided a wireless receiver comprising:

an input for receiving receive wireless signals of a first protocol designed for communicating data packets having a first preamble period and receiving wireless signals of a second protocol designed for communicating data packets having a second preamble period which is N times the first preamble period, where N is a positive integer, a time-shifter for generating a first time-shifted data packet with respect to a received data packet by a first time shift equal to M times the second preamble period, where M is a non-zero integer;

a correlator for determining a first correlation metric based on the received data packet and the time-shifted data packet; and one or more processor for determining the undetermined protocol as belonging to a set of protocols, including the first protocol and the second protocol, based on the first correlation metric.

The wireless receiver may further comprises a decoder for decoding the data packets having the first preamble period. The wireless receiver may be configured to execute the method of the first aspect.

According to a third aspect of the disclosure, there is provided a transceiver comprising:

a wireless transmitter; and a wireless receiver of the second aspect configured to execute the method of the first aspect.

The transceiver may further be configured to execute the step of causing the wireless transmitter to cease or be prevented from transmission.

According to a fourth aspect of the disclosure, there is provided a non-transitory machine-readable medium comprising machine-readable instructions which on execution by a processor cause a wireless receiver configured to:

receive wireless signals of a first protocol designed for communicating data packets having a first preamble period; and receive wireless signals of a second protocol designed for communicating data packets having a second preamble period which is N times the first preamble period, where N is a positive integer, to execute the steps of the method of the first aspect.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIG. 1A illustrates channel allocation of IEEE 802.11p signals.

FIG. 3A illustrates schematically a received and delayed 11p packet.

FIG. 3B illustrates schematically a received and delayed 11ac packet.

DETAILED DESCRIPTION OF EMBODIMENTS

Introduction

Figure 1B:
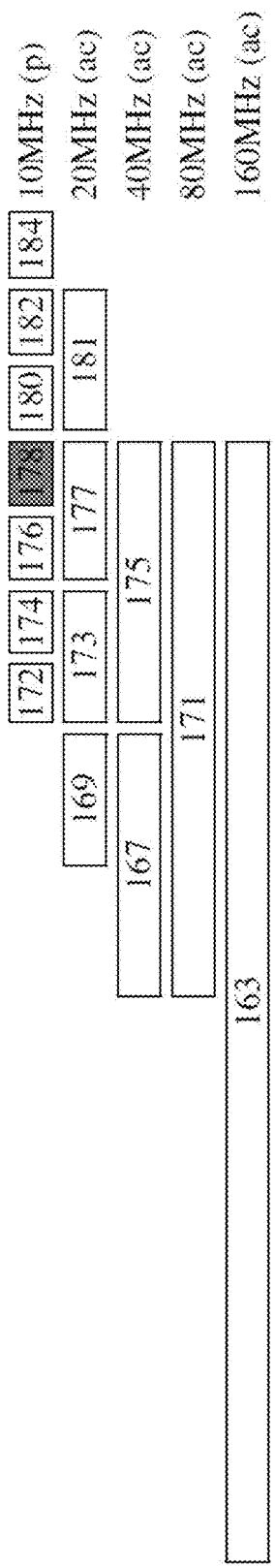
FIG. 1B illustrates schematically a spectral diagram of IEEE 802.11p channels.

Described herein is a wireless receiver configured to receive wireless signals containing data packets transmitted according to an undetermined communications protocol selected from at least a first communications protocol and a second communications protocol. Without necessarily decoding the data packets, for example according to either the first or the second communication protocol, the described wireless receiver is able to concurrently detect presence of signal transmission in the first communications protocol or the second communications protocol. In some arrangements, the described wireless receiver may be configured to differentiate between the first communications protocol and the second communications protocol. The ability of the wireless receiver to detect presence of signal transmission by other wireless devices may provide intelligence to an associated wireless transmitter of any concurrent signal transmission so as to minimise interference.

The described wireless receiver is suited to communication environments where the first protocol and the second protocol enable wireless transmission in substantially the same or overlapping frequency bands, but define different preamble lengths, and hence different preamble periods, for the data packets of the different protocols. In particular, the described wireless receiver is suited to environments where the preamble period ($T_{s2}$) of the second protocol is a multiple of the preamble period ($T_{s1}$) of the first protocol. That is, $T_{s2}=N*T_{s1}$ where N is a positive integer.

In examples described below, the first protocol is IEEE 802.11ac and the second protocol is IEEE 802.11p, whose preamble periods are defined to be 0.8 μs and 1.6 μs, respectively. However, it will be appreciated by a skilled person in the art that the principles described herein are applicable to other pairs of protocols, such as IEEE 802.11a/b/g/n and IEEE 802.11p, where the preamble period of one protocol is a multiple of the other.

IEEE 802.11p (hereinafter "11p") is used globally in the emerging vehicle-to-vehicle communications standards, such as those being tested in the Safety Pilot Model Deployment in the US and the SimTD project in Germany 11p devices typically operate in a "10 MHz" mode in which data symbols, which are orthogonal frequency division multiplexing (OFDM) symbols, are 6.4 μs long (excluding cyclic prefix). The channels used for communication are between 5.850 and 5.925 GHz and are numbered as the 5 MHz multiples from 5.000 GHz according to their centre frequency. For example, channel 172 is centred at 5.860 GHz. Channel spacing of 11p is 10 MHz. Other common frequency channels are illustrated in the table of FIG. 1A.

In the field trials in Europe, the Safety Messages were principally exchanged on the CCH (Channel 180). In the US field trials, the Safety Messages were principally exchange on the Safety Channel (Channel 172). Ideally these frequency channels are protected from interference by requiring compliant devices to first detect presence of existing signal transmission in these channels before transmission.

Meanwhile an emerging WiFi standard called IEEE 802.11ac (hereinafter "11ac") has been developed to further increase WiFi data rates of previous standards. 11ac has been designed to interoperate with other IEEE 802.11 devices operating with 20 MHz channel spacing, such as IEEE 802.11a and IEEE 802.11g, which have 3.2 μs long OFDM symbols, or half the length of 11p symbols. The bandwidths available in 11ac extend to 40, 80 and 160 MHz channel spacing, compared with 10 MHz channel spacing used in 11p channels. The channel number and spectral extent of 11p channels and 11ac channels are schematically shown in the spectral diagram in FIG. 1B. It is noted that channels designated for Safety Messages in the 11p field trials (i.e. channels 172 and 178) overlap with some of 11ac frequency channels.

Dynamic Frequency Selection

IEEE 802.11 is designed to minimise interference with other classes of communications devices by a scheme called dynamic frequency selection (DFS). If an IEEE 802.11 device detects presence of protected transmission on a particular channel currently taking place, the device will cease, or be prevented from, transmitting on that channel. The device may be configured to determine again later if the channel is clear of the protected transmission. The implementation of DFS may be protective of the incumbent. For example, it is a requirement that the channel should be clear for at least a specified duration, such as several seconds, before transmission by other devices in that channel can be allowed and the cessation of transmission must be immediate if protected transmission is detected.

Single Protocol Environment

Figure 2A:
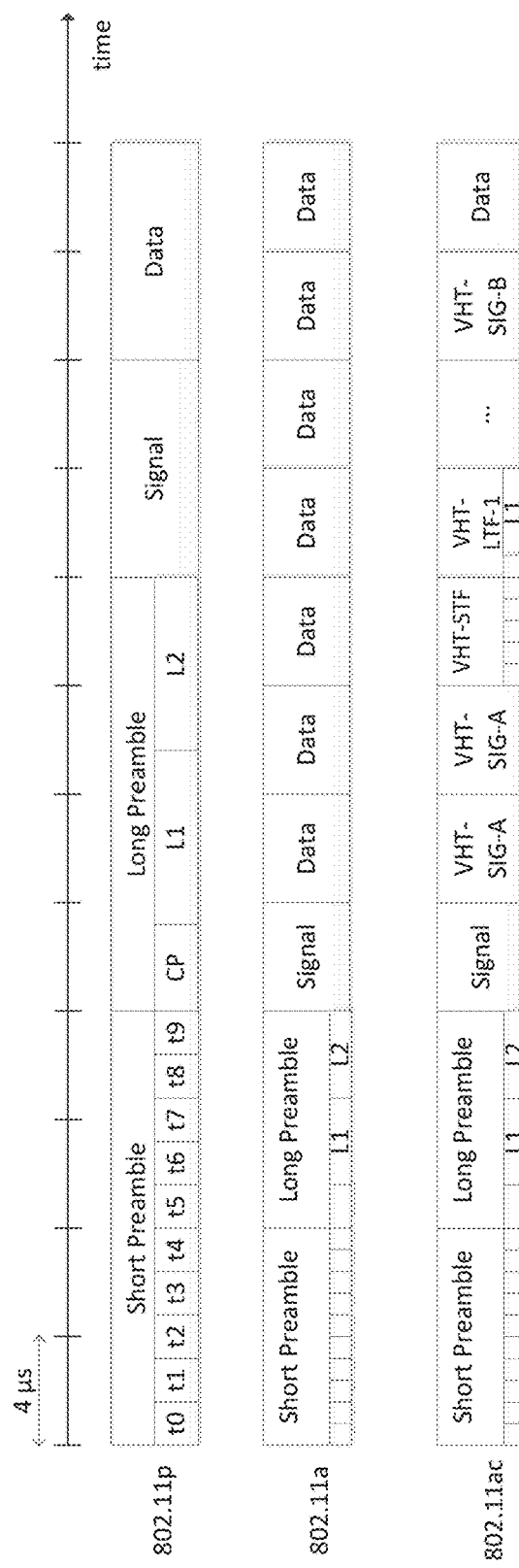
FIG. 2A illustrates schematically the structure of an 802.11a packet, an 802.11ac packet and an 802.11p packet.

Techniques for detecting concurrent transmission in a single-protocol environment, using IEEE 802.11ac as an example, will be first described. IEEE 802.11 is a packet based communications protocol. IEEE 802.11 devices are designed to continuously listen for a packet unless they are transmitting a data packet. FIG. 2A illustrates schematically the structure of 11a, 11ac and 11p packets. In general, the packet structure of IEEE 802.11 includes a short preamble, a long preamble, a signal portion and one or more data portions. Unless otherwise stated, a reference to "preamble" herein is a reference to the short preamble.

Figure 2B:
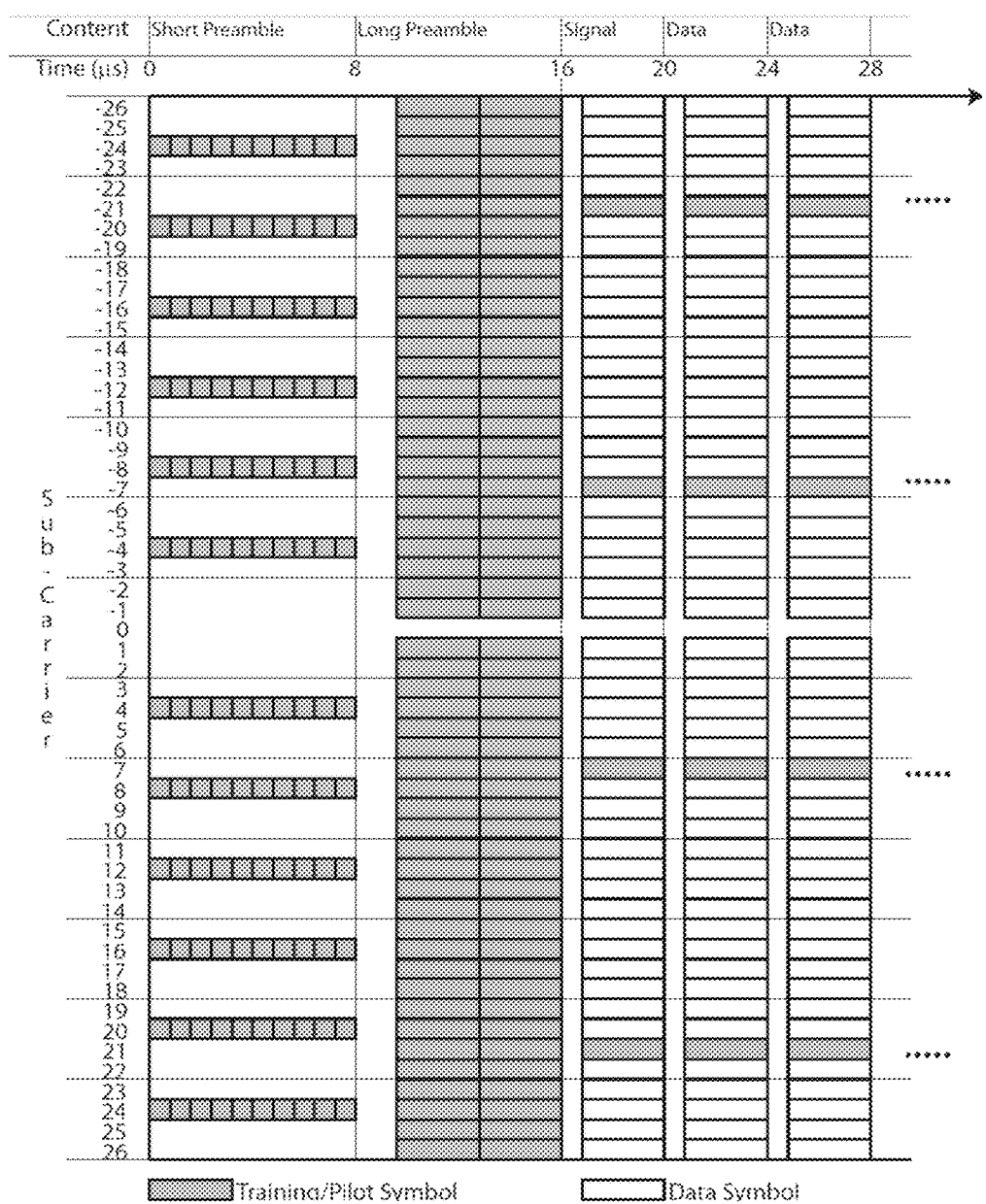
FIG. 2B illustrates schematically pilot/training and data symbols carried in subcarriers of an 802.11a packet.

In an environment having signal transmission of only a single protocol (e.g. only 11ac or only 11p), the presence of data packets in the air can be detected by a wireless receiver by processing the preamble, for example the short preamble, of the data packets. In both 11ac and 11p, the short preamble consists of 10 repetitions of a short time domain signal of preamble period $T_s$. For 11ac packets, as illustrated in FIG. 2A, the preamble period $T_s$ is $T_{11ac}$=0.8 μs and the preamble length is 8.0 μs. Similarly, for 11p packets, the preamble period $T_s$ is $T_{11p}$=1.6 μs and the preamble length is 16 μs. FIG. 2B illustrates schematically a more detailed representation of a 11a packet. Pilot or training symbols are contained in the short preamble and the long preamble for, for example, channel estimation. Further, the 11a packet includes a number of subcarriers, some of which contain pilot or training symbols in their signal and data portions.

An approach for processing the preamble for detecting presence of data packets in the air is a "delay and correlate" technique. The technique correlates the received signal with a time-shifted version, such as a delayed version, of the received signal according to the following equation:

$$Corr(n) = \sum_{l=0}^{L-1} r_{n-l}(r_{n-l-D})^* \qquad (1)$$

where $r_n$ is the n-th complex-valued IQ baseband sample received by the wireless receiver, Corr(n) is a complex-valued correlation metric for the n-th sample, D is the time shift measured in number of samples, L is the correlation length measured in number of samples and * represents a complex conjugate operation. The correlation metric provides an indication of any repetition in the input sequence of samples $r_n$ at a repetition period of D.

The length of the correlation L (measured in time) is set equal to the preamble length (measured in time) minus $T_s$. For example, in 11ac, the preamble period $T_s$ is $T_{11ac}$=0.8 μs and the correlation length is set to 10*0.8−0.8=7.2 μs. Similarly, in 11p, the preamble period $T_s$ is $T_{11p}$=1.6 μs and the correlation length is set to 10*1.6−1.6=14.4 μs. When measured in number of samples, L for a 7.2 μs time interval at a sampling rate of 20 MHz is 144, whereas L for a 14.4 μs time interval at a sampling rate of 10 MHz is also 144.

FIGS. 3A and 3B illustrate a received version and a delayed version of an 11p packet and an 11ac packet, respectively. An 11p packet delayed by $T_{11p}$=1.6 μs can be seen in FIG. 3A to have 9 repetitions of short preambles overlapped with those in its received version. Similarly an 11ac packet delayed by $T_{11ac}$=0.8 μs can be seen in FIG. 3B to have 9 repetitions of short preambles overlapped with those in its received version. Accordingly, if the time shift D is set to correspond to the preamble period (i.e. $T_s$), an increase in magnitude of Corr(n) is expected at certain values of n due to the repetition of the short preamble every $T_s$ seconds.

Figure 4A:
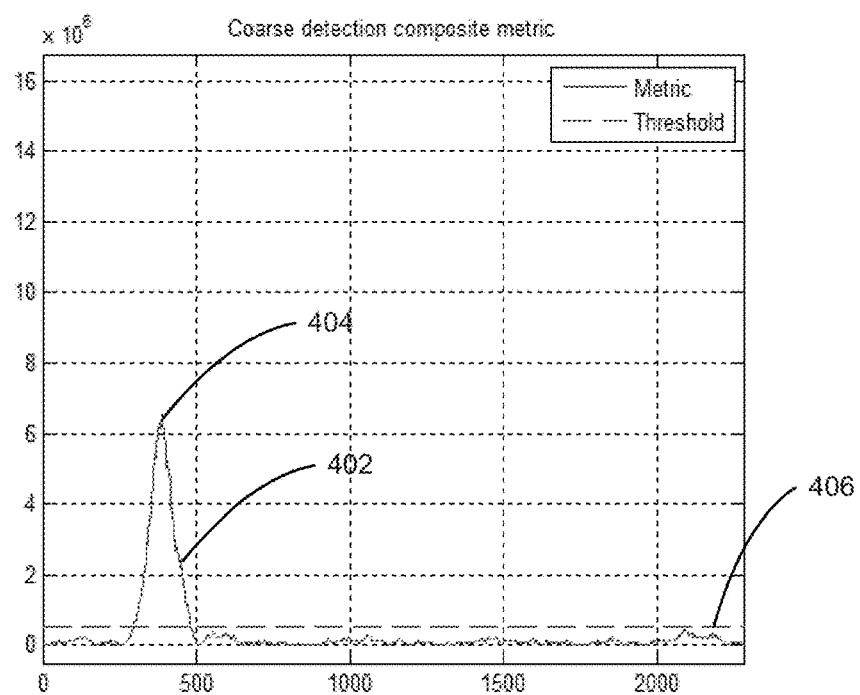
FIG. 4A illustrates a plot of the squared magnitude of the correlation metric (in arbitrary units) versus sample number n, where the input is a 11ac signal and D corresponds to $T_s = T_{11ac} = 0.8$ μs.

The correlation metric may be represented in different forms. FIG. 4A illustrates the squared magnitude 402 of the correlation metric $|Corr(n)|^2$, representing the power of Corr(n), against sample number n where the input is a received 11ac signal and D is set to the equivalent number of samples to $T_{11ac}$=0.8 μs. An increase of $|Corr(n)|^2$, in this case forming a peak 404, is illustrated. Formation of the peak 404 arises from the overlap in the short preambles between the received packet and its delayed version, and corresponds to the presence of an 11ac signal. Accordingly a wireless transceiver incorporating the described wireless receiver may be configured to determine that 11ac signal transmission is currently taking place by determining whether the correlation metric satisfies a criterion, such as its power $|Corr(n)|^2$ exceeding a certain threshold 406, in which case the wireless device may be caused to cease or be prevented from transmitting. When the time shift D is set to correspond to the beat of the repetition of the short preamble, the delay and correlate technique can be robust to large frequency offsets.

Multiple-Protocol Environment

In almost all IEEE 802.11 protocols that are non-IEEE 802.11p, the preamble period $T_s$ of the data packets is twice as long as that of IEEE 802.11p data packets. Higher-speed IEEE 802.11ac variants replicate the 20 MHz preamble multiple times to accommodate the available bandwidths of 40, 80 and 160 MHz. This replication allows coexistence of IEEE 802.11ac devices with IEEE 802.11a/g/n devices which all have 20 MHz preambles with $T_s$ of 0.8 μs.

Figure 4B:
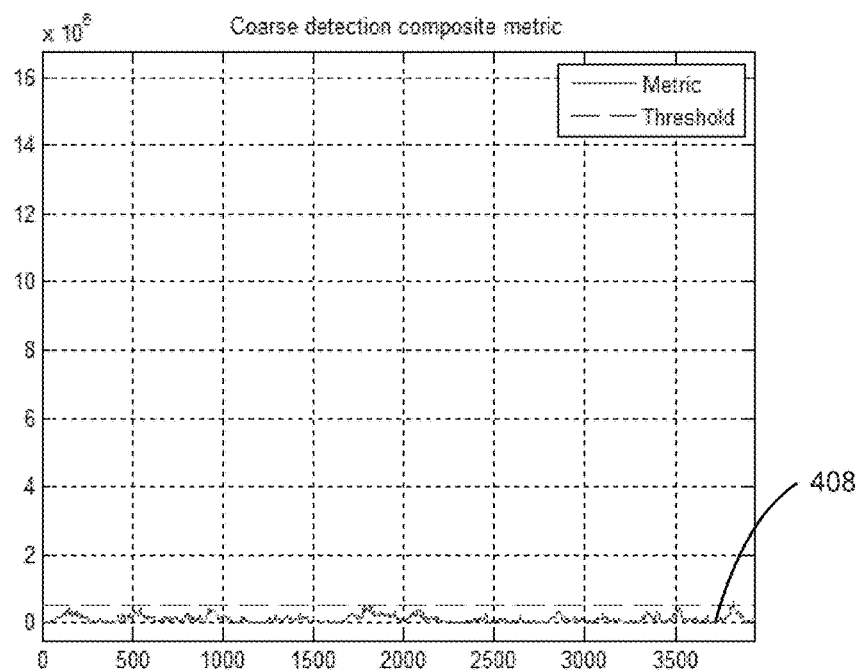
FIG. 4B illustrates a plot of the squared magnitude of the correlation metric (in arbitrary units) versus sample number n, where the input is a 11p signal and D corresponds to $T_s = T_{11ac} = 0.8$ μs.

As illustrated in the spectral diagram in FIG. 1B, the emerging IEEE 802.11ac standard may operate in frequency bands where IEEE 802.11p devices are present. If an 11ac device is configured to employ the delay and correlate technique described above in a single protocol environment (e.g. to detect the presence 11ac packets) by setting D to the equivalent number of samples to 0.8 μs, the 11ac device will not be able to detect 11p packets. FIG. 4B illustrates a plot of the squared magnitude 408 of the correlation metric $|Corr(n)|^2$ against sample number n, where the input is a received 11p signal and D is set to $T_{11ac}$=0.8 μs measured in sample number. No temporal peak is seen forming when the input is a 11p signal.

For an 11ac receiver to detect the presence of 11p packets, one potential technique is to half-clock the 11ac receiver, which originally operates at 20 MHz, to operate at 10 MHz to be able to decode any received 11p packets. However while the 11ac receiver is half-clocked to 10 MHz, it will not be able to detect transmission by other 11ac or 20 MHz based devices. Another potential technique for an 11ac receiver to detect 11p transmission is to determine the spectral information of a received signal. In an ideal environment, the spectrum of a received 11p signal as seen in an 11ac front end should appear offset from the 11ac centre frequencies given the channelisation previously discussed and shown in the spectral diagram in FIG. 1B. Further, the spectral width of 11p transmission should be half of that of 11ac transmission. In practice, however, the centre frequency and the spectral width are both unreliable indicators. Relying on the centre frequency of a received signal is susceptible to the presence of a frequency offset, especially large frequency offset, whereas the true spectral width of a signal may be masked by the presence of adjacent channels, which could for example render two 10 MHz channels appear as a single 20 MHz channel.

Wireless Receiver

Figure 5A:
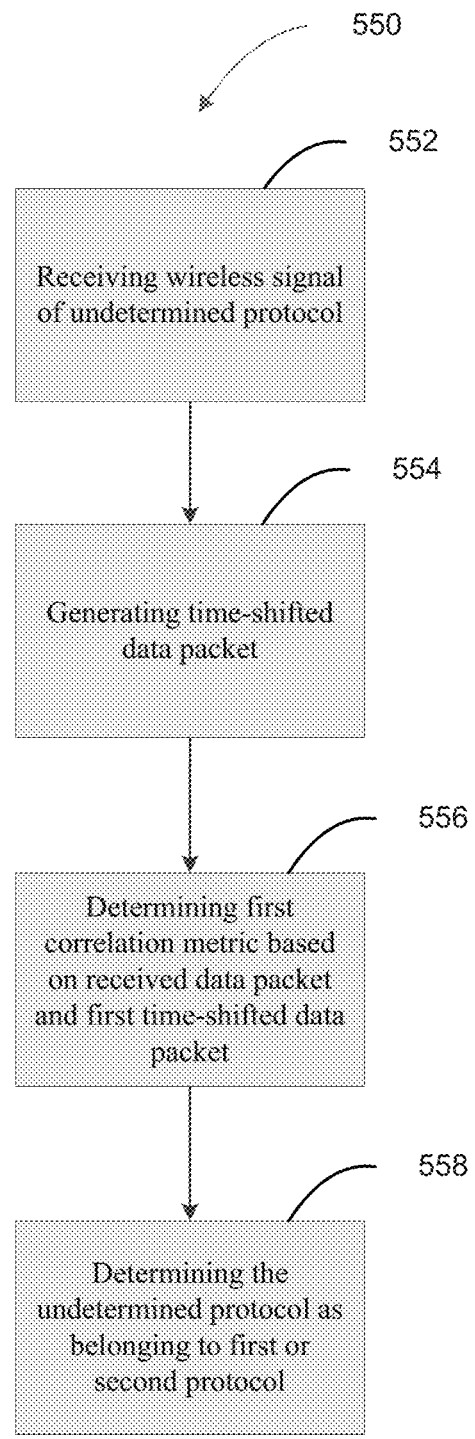
FIG. 5A illustrates schematically a method executable by wireless receiver for determining a protocol of a received packet.

A wireless receiver overcoming the disadvantages of the two potential techniques above is now described in detail. In its most general form, the described wireless receiver is configured to receive wireless signals of a first protocol designed for communicating data packets having a first preamble period and receive wireless signals of a second protocol designed for communicating data packets having a second preamble period which is N times the first preamble period, where N is a positive integer. As illustrated in FIG. 5A, the described wireless receiver is configured to execute a method 550 comprising the steps of:

receiving a wireless signal of an undetermined protocol, the wireless signal carrying a data packet (step 552);

generating a first time-shifted data packet with respect to the received data packet by a first time shift equal to M times the second preamble period, where M is a non-zero integer (step 554);

determining a first correlation metric based on the received data packet and the first time-shifted data packet (step 556), and determining the undetermined protocol as belonging to a set of protocols including at least the first or second protocol based on the first correlation metric (step 558).

The described wireless receiver may be a part of a wireless transceiver which also includes a wireless transmitter. The wireless transmitter may rely on the wireless receiver to provide intelligence as to whether protected transmission is currently taking place so as to cease or postpone its own transmission to minimise interference. For example, once the wireless receiver has determined that the undetermined protocol belongs to either the first protocol or the second protocol, the wireless receiver may be configured to cause the wireless transmitter to cease or be prevented from transmission. The cessation of transmission may last for a fixed period of time, such as several seconds or otherwise determined by either protocol. The described wireless receiver is envisaged to be applied to environments where the first protocol is IEEE 802.11ac and the second protocol is IEEE 802.11p. In such environments, N is 2 since the first preamble period is defined by the first protocol to be $T_{11ac}$=0.8 μs and the second preamble period is defined by the second protocol to be $T_{11p}$ is 1.6 μs. The description hereinafter is provided in view of these two specific protocols but it should be apparent that the described wireless receiver can be applied to other pairs of protocols whose respective preamble periods are related by a positive integer.

Figure 5B:
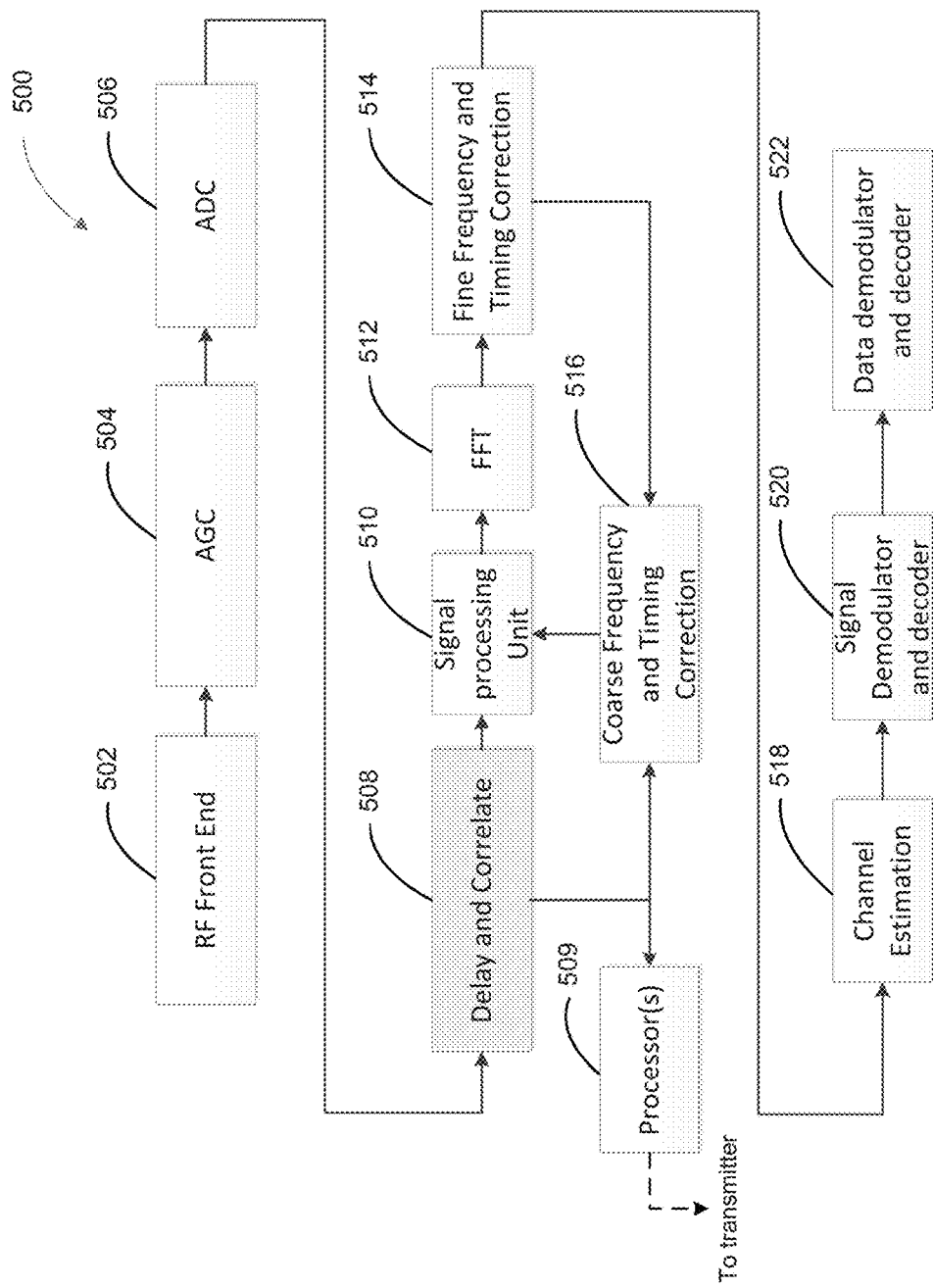
FIG. 5B illustrates schematically a first example of a wireless receiver.

FIG. 5B illustrates schematically an example of a wireless receiver 500. The illustrated wireless receiver 500 includes a radio-frequency (RF) front end 502 for receiving wireless signals received by, for example, an antenna and an automatic gain control (AGC) unit 504 for amplifying or attenuating the received signals to an appropriate level before being fed to an analogue-to-digital converter (ADC) 506 to provide a digital representation of the received wireless signals. The output of the ADC 506 is then provided to a delay and correlate circuit 508 providing a correlation metric, which can then be used for determining if the received signal contains protected transmission. The wireless receiver 500 may include one or more processors 509 for determining if the received signal belongs to the 11ac or 11p protocol. If so, the determination may be used to cause to a wireless transmitter to cease or prevented from transmission.

One or more of the functional blocks of the wireless receiver 500 illustrated in FIG. 5B may be implemented as software, such as a computer program including instructions stored in a non-transitory computer-readable medium and executable by the one or more processors. In one example, the non-transitory computer-readable medium is a memory or storage module, such as volatile memory including a random access memory (RAM), non-volatile memory including read-only memory (ROM), or a hard disk. The one or more processors may be one or more computer processing units (CPUs). Alternatively or additionally the one or more of the functional blocks of the wireless receiver 500 may be implemented as hardware, such as using one or more digital signal processors (DSPs), application-specific integrated circuits (ASICs) or field-programmable gate arrays (FPGAs).

The output of the delay and correlate circuit 508 may be provided to a wireless transceiver, based on which the wireless transceiver may be configured to determine whether it is allowed to transmit in the frequency channel to which the receiver is listening. Additionally, the output of the delay and correlate circuit 508 may be provided to one or more subsequent modules of the wireless receiver, including a signal processing unit 510 for processing the received data, a fast-Fourier transform (FFT) unit 512 for providing spectral information of the received signal by transforming the received data in the spectral domain, a fine frequency and timing correction unit 514 and a coarse frequency and timing correction unit 516, a channel estimator 518, a signal demodulator and decoder 520 and a data demodulator and decoder 522.

Figure 5C:
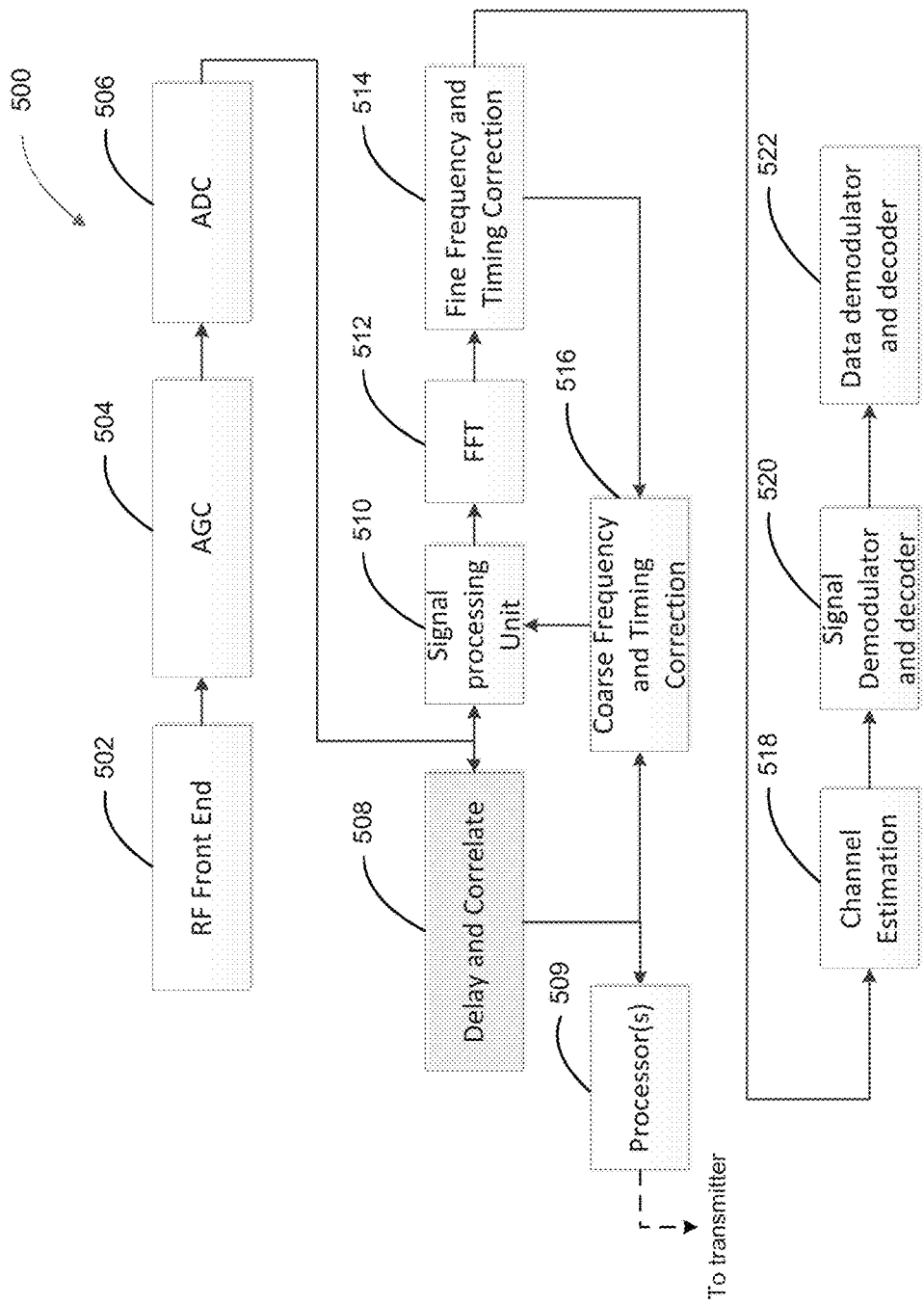
FIG. 5C illustrates schematically a variant of the wireless receiver of FIG. 5B.

FIG. 5C illustrates a variant 501 of the wireless receiver 500 of FIG. 5B. While the wireless receiver 500 of FIG. 5B includes the delay and correlate circuit 508 in between the ADC 506 and the signal processing unit 510 (i.e. receiving an input from ADC 506 and providing an output to the signal processing unit 510), the variant 501 of FIG. 5C includes the delay and correlate circuit 508 such that both the delay and correlate circuit 508 and signal processing unit 510 receives an input from the ADC 506.

In general, the delay and correlate circuit 508 is configured to detect packets of different protocols based on their preambles (e.g. determining their preamble periods). If a packet is detected, the packet may be passed on to other subsequent modules for processing, without necessarily passing non-preamble portion (e.g. the signal or data portions) of the packet through the delay and correlate circuit 508. In some cases, the delay and correlate circuit 508 may cease to operate upon detection of a packet.

Figure 6:
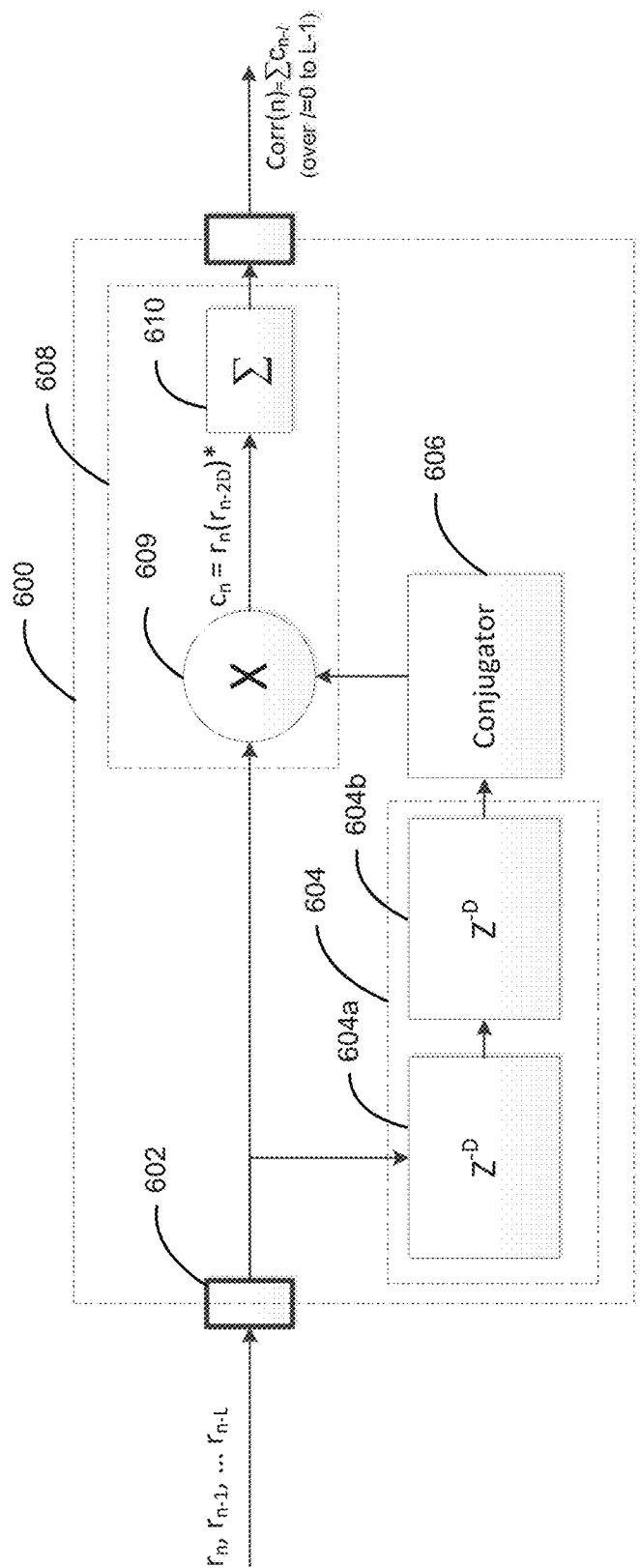
FIG. 6 illustrates schematically an example of a delay and correlate circuit in the wireless receiver of FIG. 5B.

FIG. 6 illustrates an example 600 of a delay and correlate circuit 508. The delay and correlate circuit 600 includes an input 602 for receiving samples (for example from an output of the ADC that digitises the wireless received wireless signal), a time-shifter 604 for introducing a time shift, and a complex conjugator 606 for generating a complex conjugate of the received samples, a correlator 608 for performing multiplication (by a multiplier 609) and summing computation (by a adder 610) according to equation (1), and an output 612 for producing a correlation metric. In this example, the time-shifter 604 includes two delay blocks 604a and 604b, each configured to time-shift the input samples by a delay D, where D corresponds to the first preamble period. The total delay thus corresponds to the second preamble period or twice the first preamble period. In general, the time-shifter 604 includes N delay blocks. Correlation length L may be set to a length consistent with the first preamble length, i.e. L=first preamble length (in number of samples)−first preamble period (in number of samples). In the time domain, the correlation length is 8.0 µs−0.8 µs=7.2 µs.

In use, the input samples are passed to the time shifter 604 for time shifting the input samples by a delay of 2D, or more generally ND, and then passed to the complex conjugator 606. The input samples are also passed to the correlator 608 for combining the received samples and the time-shifted conjugated samples to produce the correlation metric Corr (n) at the output 612 according to equation (1).

To be able to simultaneously detect presence of both 11ac and 11p transmission, the delay and correlate circuit 508 may be in the form of the delay and correlate circuit 600 with 2D set to $T_{11p}=2T_{11ac}=1.6$ µs in the equivalent number of samples. In other words, the total time shift is set to the second preamble period (for M=1) or N times the first preamble. M=2, 3 or 4 may be used. Using M≥5 however would delay a 11ac packet by $10T_{11ac}$ or more such that there is no overlapped short preambles between the received packet and the delayed packet. If either an 11ac or 11p signal is received, $|Corr(n)|^2$ will be expected to increase beyond a certain threshold.

Figure 7A:
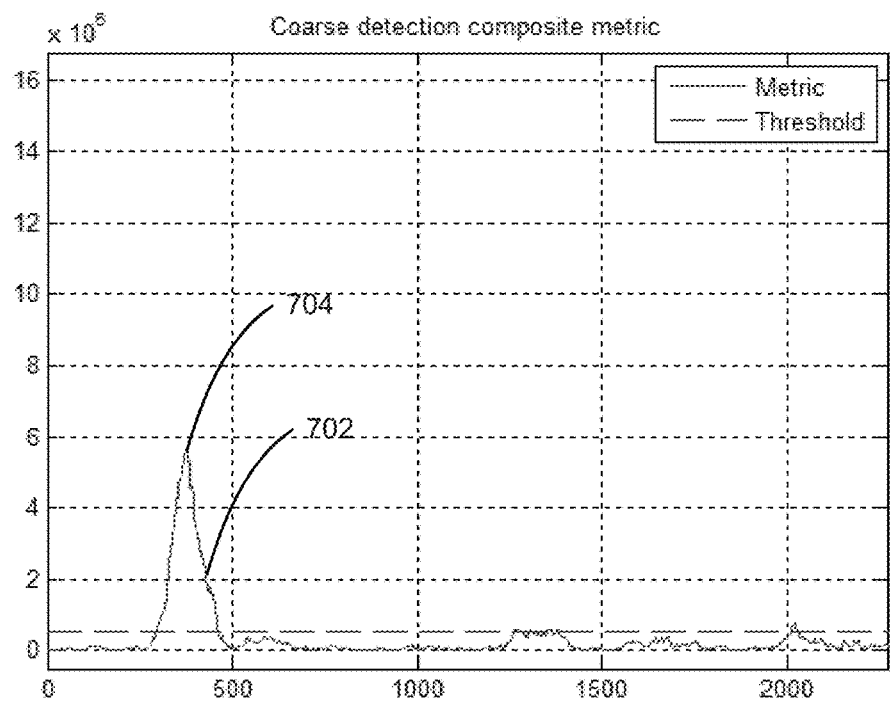
FIG. 7A illustrates a plot of the squared magnitude of the correlation metric (in arbitrary units) versus sample number n, where the input is a 11ac signal and D corresponds to $2T_{11ac} = 1.6$ μs.
Figure 7B:
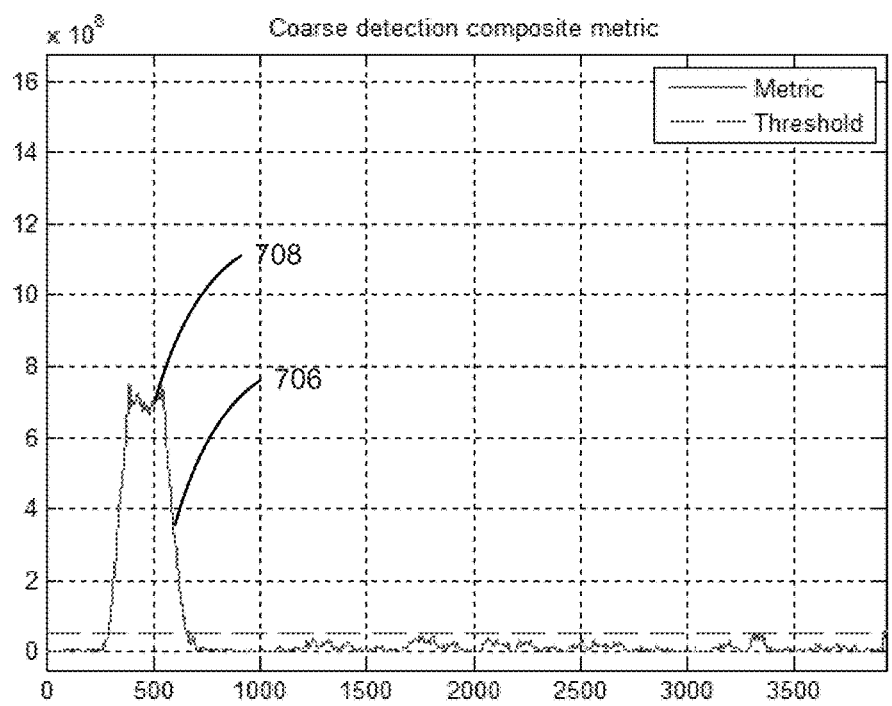
FIG. 7B illustrates a plot of the squared magnitude of the correlation metric (in arbitrary units) versus sample number n, where the input is a 11p signal and D corresponds to $T_{11p} = 1.6$ μs.

FIG. 7A plots the squared magnitude 702 of the correlation metric $|Corr(n)|^2$ against sample number n with a received 11ac signal as an input to the delay and correlate circuit where the time shift is set to $T_{11p}=2T_{11ac}=2\times0.8$ µs=1.6 µs in the equivalent number of samples. An increase of $|Corr(n)|^2$, in this case forming a peak 704, is illustrated. Formation of the peak 704 indicates the input as an 11ac signal. FIG. 7B plots the squared magnitude 706 of the correlation metric $|Corr(n)|^2$ against sample number n with a received 11p signal as an input to the delay and correlate circuit where the time shift remains to be set to $T_{11p}=2T_{11ac}=2\times0.8$ µs=1.6 µs in the equivalent number of samples. An increase of $|Corr(n)|^2$, in this case forming a plateau section 708, is illustrated. Formation of the plateau section 708 indicates the input as an 11p signal.

The formation of plateau section 708, rather than a peak similar to peak 704, when the input into the delay and correlate circuit 508 is a 11p signal may be understood as follows. A 11p receiver operates at 10 MHz, in which case a delay by a single 11p preamble period of 1.6 µs in a delay and correlate circuit would result in an overlap of 9 short preambles within the correlation length (measured in time) of 10*1.6−1.6=14.4 µs. However, as mentioned, a 11ac receiver operates at 20 MHz and therefore samples the short preambles of any received signal for half as short the duration as a 11p receiver. In other words, when a 11p signal is sampled at 20 MHz and delayed by the delay and correlate circuit 508 for 1.6 µs, the overlap in the short preambles occurs within a correlation length (measured in time) of 10*0.8−1.6=6.4 µs, which is equivalent to the length of only 4 short preambles in a 11p packet. The reduced number of overlapped short preambles (from 9 to 4) results in a plateau rather than a peak in the correlation metric $|Corr(n)|^2$.

Differentiation Between 11Ac and 11p Transmission

Once a received signal is determined to contain protected transmission, the wireless receiver may be further configured to determine whether the protected transmission is an 11ac signal or an 11p signal. There are at least 3 arrangements in which the wireless receiver can be configured to differentiate between the two protocols. Two or more of these arrangements may be combined for more accurate determination.

Figure 8:
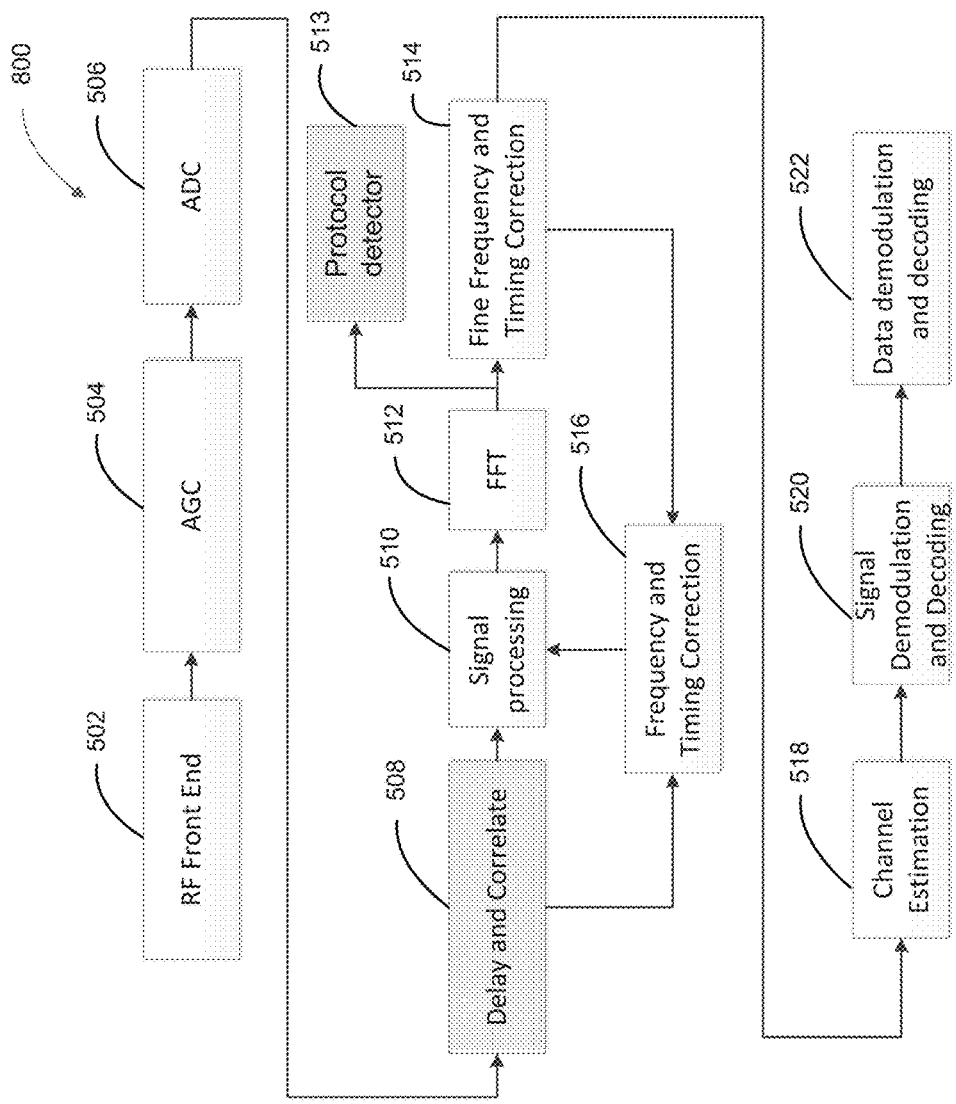
FIG. 8 illustrates schematically a second example of a wireless receiver.

In a first arrangement, as illustrated in FIG. 8, a wireless receiver 800 includes a protocol detector 513 placed downstream from the FFT unit 512. The protocol detector 513 may be configured to determine the protocol of the received wireless signal based on spectral information provided by the FFT unit 512. The spectral information may be a calculated bandwidth of the received samples based on their Fourier transform. For example, an 11ac signal is typically 2, 4, 8 or 16 times wider in bandwidth than an 11p signal which is typically less than 10 MHz in bandwidth. The protocol detector 513 may therefore determine that the received signal is an 11p signal if the calculated bandwidth of the received signal is less than 10 MHz, or determine that the received signal is an 11ac signal if the calculated bandwidth of the received signal is greater than or equal to 10 MHz. An advantage of this alternative is that FFT processing is normally required immediately after delay and correlate in order to commence decoding of the packet. Note that the arrangement shown in FIG. 8 is similar to that in FIG. 5B where the delay and correlation circuit 508 is placed in between the ADC 506 and the signal processing unit 510. Although not shown, a variant of the arrangement shown in FIG. 8 may be similar to that in FIG. 5C where both the delay and correlate circuit 508 and the signal processing unit 510 receives an input from the ADC 506.

Figure 9A:
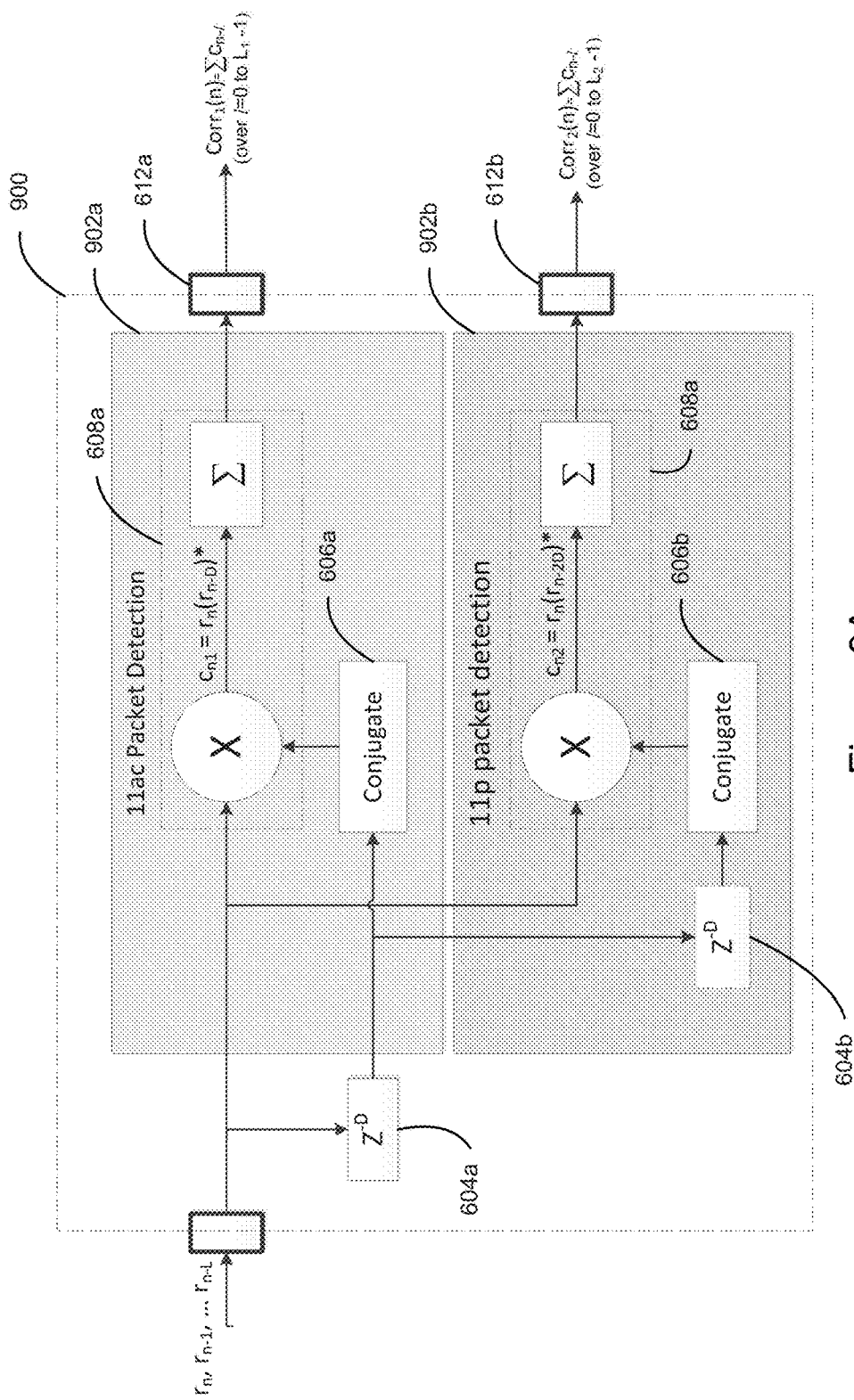
FIG. 9A illustrates schematically an example of a modified delay and correlate circuit in the wireless receiver of FIG. 5B.
Figure 9B:
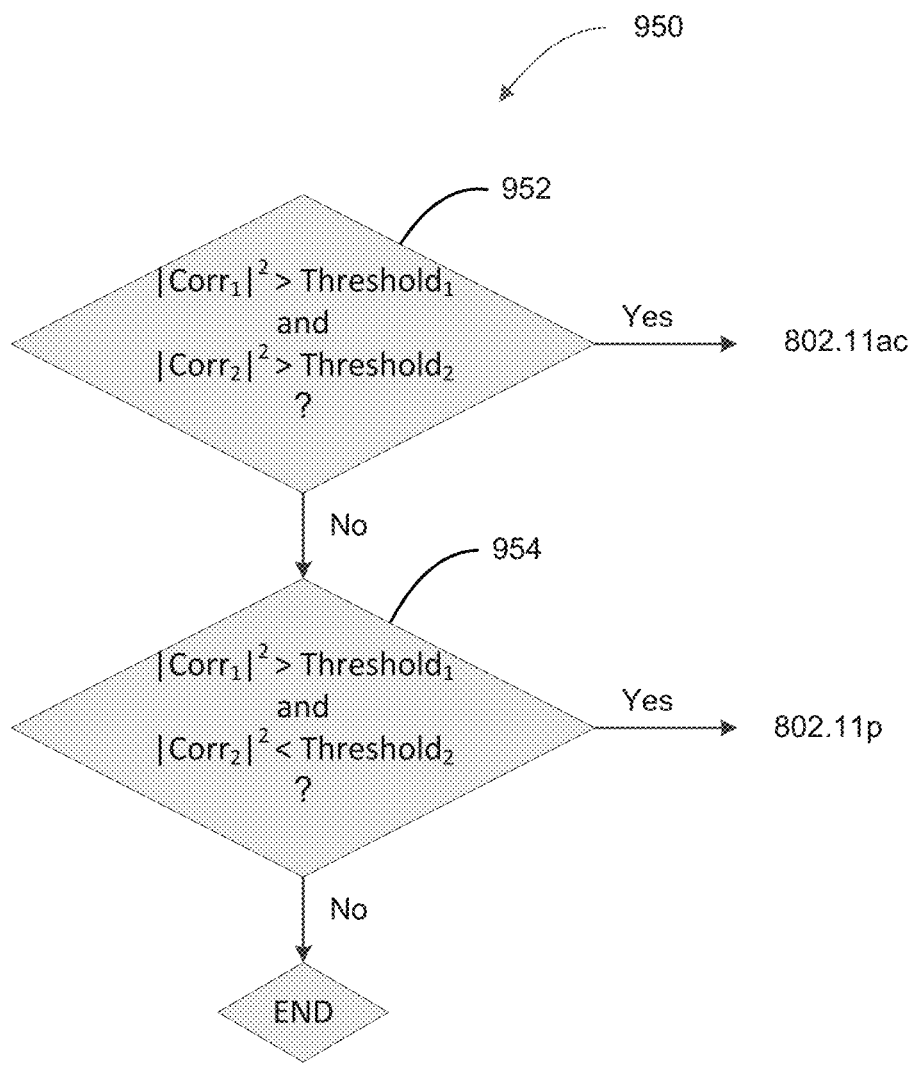
FIG. 9B illustrates a flow diagram of a method determining whether a received signal is an 11 ac signal or an 11p signal for use in conjunction with the modified delay and correlate circuit in FIG. 9A.

In a second arrangement, the delay and correlate circuit 508 in wireless receiver 500 may be modified as illustrated in FIG. 9A. The modified delay and correlate circuit 900 includes, downstream from the first delay block 604a with a time shift D set to $T_{11ac}$=0.8 µs in the equivalent number of samples, a first signal processing path 902a and a second signal processing path 902b. Each path includes a complex conjugator (606a and 606b), a correlator (608a and 608b) and an output (612a and 612b) for producing a correlation metric ($Corr_{-1}(n)$ and $Corr_2(n)$). Further, the second processing path 902b includes a further delay block 604b with a time shift D set to 0.8 µs in the equivalent number of samples. In effect, the time shifts introduced in the first and the second processing paths 902a and 902b are 0.8 µs and 1.6 µs, respectively. The first processing path 902a is therefore configured to detect an 11ac signal and produce a first correlation metric $Corr_1(n)$ which will increase in magnitude if the received signal is an 11ac signal and will not increase in magnitude if the received signal is an 11p signal. Like the delay and correlate circuit 600 in FIG. 6, the second processing path 902b is configured to detect an 11ac or 11p signal and produce a second correlation metric $Corr_2(n)$ which will increase in magnitude if the received signal is either an 11ac or 11p signal. Accordingly, as illustrated in FIG. 9B, a method 950 of determining whether the received signal is an 11ac signal or an 11p signal may proceed as follows. In step 952, if the first correlation metric $Corr_1$ satisfies an appropriate criterion, such as its squared magnitude $|Corr_1|^2$ exceeding a first threshold, and the second correlation metric $Corr_2$ satisfies an appropriate criterion, such as its squared magnitude $|Corr_2|^2$ exceeding a second threshold, it is determined that the received signal is an 11ac signal. In step 954, if first correlation metric $Corr_1$ satisfies an appropriate criterion, such as its squared magnitude $|Corr_1|^2$ exceeding the first threshold, and the second correlation metric $Corr_2$ does not satisfy an appropriate criterion, such as its squared magnitude $|Corr_2|^2$ not exceeding the second threshold, it is determined that the received signal is an 11p signal. In general, the first delay block 604a is set with a time shift of $3T_{11ac}$, $5T_{11ac}$ or $7T_{11ac}$ for the first path 902a (and the second delay block 604b is set with a time shift of $T_{11ac}$), such that the total time shift introduced in the second path 902b is $4T_{11}ac$, $6T_{11ac}$ or $8T_{11ac}$ (or $2T_{11p}$, $3T_{11p}$ or $4T_{11p}$), respectively. In other words, the first delay block 604a may be set with a time shift equivalent to $QT_{11ac}$, where Q is a non-zero integer and is not an integer multiple of N.

Figure 10:
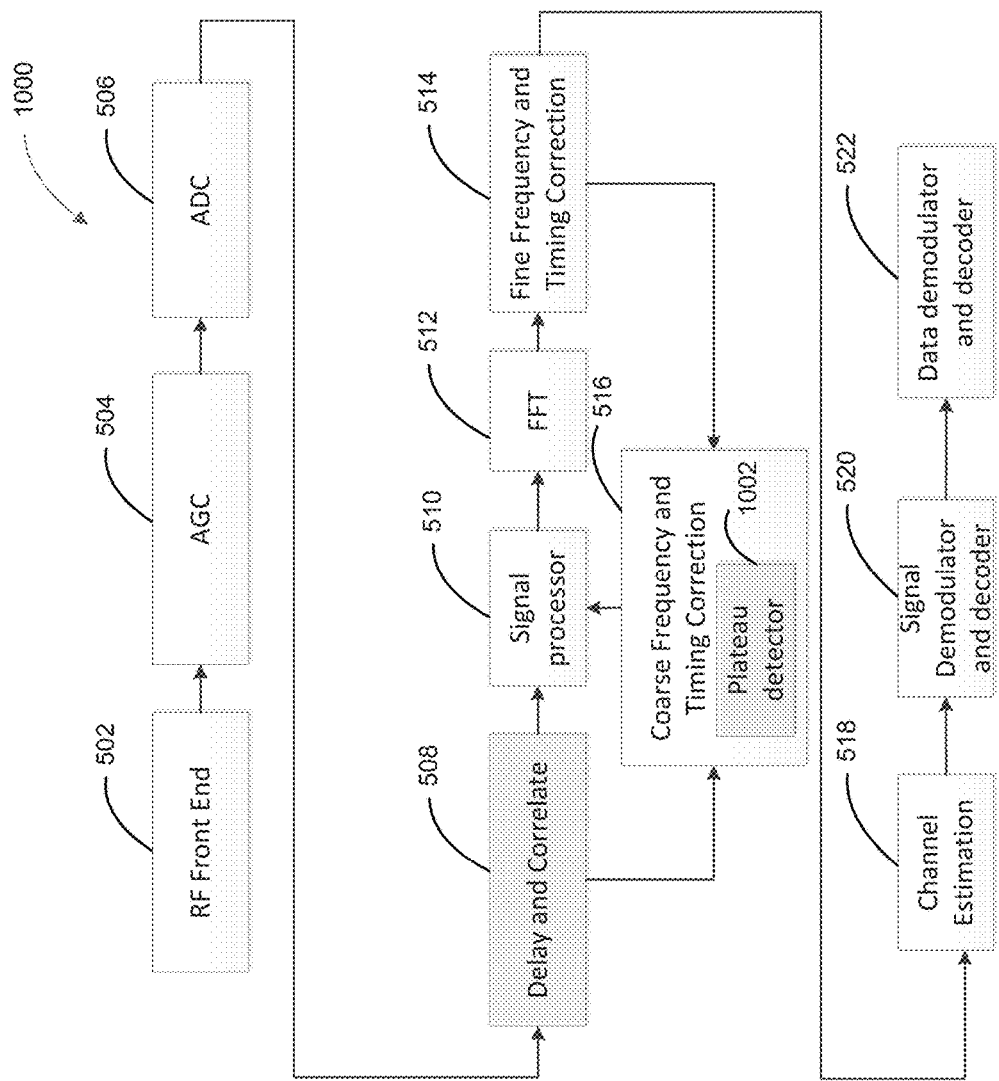
FIG. 10 illustrates schematically a third example of a wireless receiver.
Figure 11:
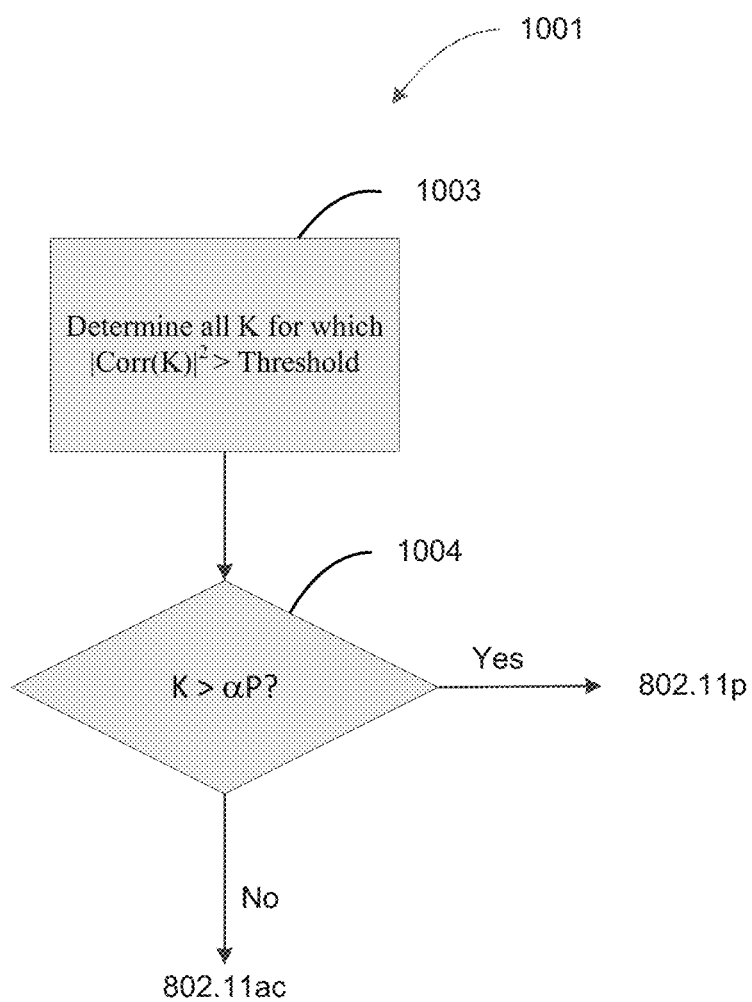
FIG. 11 illustrates a flow diagram of a method determining whether a received signal is an 11 ac signal or an 11p signal for use in conjunction with the plateau detector in FIG. 10.

In a third arrangement, as illustrated in FIG. 10, the wireless receiver 1000 includes a peak or plateau detector 1002 for detecting presence of a peak or a plateau in the correlation metric. In some cases, the wireless receiver 1000 includes a peak or plateau detector 1002 placed downstream from the delay and correlate circuit 508. For example, the peak or plateau detector 1002 may be part of the coarse frequency and time detection unit 516 which is illustrated to follow immediately after the delay and correlate circuit 508. As illustrated in FIGS. 7A and 7B, $|Corr(n)|^2$ forms a peak 704 across sample number n if the received signal is an 11ac signal, whereas $|Corr(n)|^2$ forms a plateau section 708 across sample number n if the received signal is an 11p signal. The expected extent P of the plateau, in number of samples, can be calculated as P=p-2ND-L, where p is short preamble length of an 11p signal (in number of samples), ND is the time shift (in number of samples) introduced by the time-shifter 604, and L is the correlation length (in number of samples). It is envisaged that the correlation length L should correspond to the preamble length of an 11p signal reduced by $T_{11p}$=$2T_{11ac}$=6.4 µs. Therefore, in the time domain, P is equivalent to 16 µs−3.2 µs−6.4 µs=6.4 µs (for N=2 and D=0.8 µs). Accordingly, the peak or plateau detector 1002 may be configured to determine whether the received signal is an 11ac signal or an 11p signal by a method 1001 as illustrated in FIG. 11. In step 1003, the method 1001 determines the number of sample points K for all n such that $|Corr(n)|^2$ exceeds a certain threshold. In step 1004, the method 1001 determines if K>αP, in which case the received signal is determined to be an 11p signal, where α may be a number close to but less than 1, such as 0.9. If on the other hand K≤αP, then the received signal is determined to be an 11ac signal.

Note that the arrangement shown in FIG. 10 is similar to that in FIG. 5B where the delay and correlation circuit 508 is placed in between the ADC 506 and the signal processing unit 510. Although not shown, a variant of the arrangement shown in FIG. 10 may be similar to that in FIG. 5C where both the delay and correlate circuit 508 and the signal processing unit 510 receives an input from the ADC 506.

Now that embodiments of the sensing system are described, it should be apparent to the skilled person in the art that the described wireless receiver has the following advantages:

The wireless receiver may stay listening for 11ac packets while concurrently detecting presence of 11p signals.

There is no requirement to decode 11p packets, as would occur in the half-clocking technique.

The delay and correlate technique to concurrently detect presence of 11ac and 11p signals is robust to large frequency offsets, to which a spectral analysis is susceptible.

It will be understood that the invention disclosed and defined in this specification extends to all alternative combinations of two or more of the individual features mentioned or evident from the text or drawings. For example, the first protocol and the second protocol need not be 11ac and 11p, but other pairs of protocols such that the second preamble length is a positive multiple of the first preamble length. All of these different combinations constitute various alternative aspects of the invention.

What is claimed is:

1. A method of operating a wireless receiver configured to:

receive wireless signals of a first protocol designed for communicating data packets having a first preamble period; and receive wireless signals of a second protocol designed for communicating data packets having a second preamble period which is N times the first preamble period, where N is a positive integer, the method comprising the steps of:

receiving a wireless signal of an undetermined protocol, the wireless signal carrying a data packet;

generating a first time-shifted data packet with respect to the received data packet by a first time shift equal to M times the second preamble period, where M is a non-zero integer;

determining a first correlation metric based on the received data packet and the first time-shifted data packet, and determining whether the undetermined protocol is the first protocol or the second protocol, based on the first correlation metric, the determining comprising:

generating a second time-shifted data packet with respect to the received packet by a second time shift equal to Q times the first preamble period, where Q is a non-zero integer and is not an integer multiple of N;

determining a second correlation metric based on the received data packet and the second time-shifted data packet; and determining whether the undetermined protocol is the first protocol or the second protocol based on the second correlation metric.

2. The method of claim 1 wherein determining whether the undetermined protocol is the first protocol or the second protocol includes the step of determining whether the first correlation metric satisfies a first criterion.

3. The method of claim 1 wherein the step of determining whether the undetermined protocol is the first protocol or is the second protocol is based on spectral information of the received wireless signal.

4. The method of claim 3 wherein the spectral information is obtained by transforming the received data packet into a spectral domain.

5. The method of claim 1 wherein the step of determining based on the second correlation metric includes the step of determining whether the second correlation metric satisfies a second criterion.

6. The method of claim 1 wherein the step of determining based on the second correlation metric includes the step of determining whether the second correlation metric includes a plateau section.

7. The method of claim 1 wherein the first protocol is IEEE 802.11a or IEEE 802.11ac, and the second protocol is IEEE 802.11p.

8. The method of claim 1 wherein N is 2.

9. The method of claim 8 wherein the first preamble period is 0.8 μs and the second preamble period is 1.6 μs.

10. The method of claim 1 wherein M is 1.

11. The method of claim 10 wherein the first time shift is 1.6 μs.

12. The method of claim 9 wherein the second time shift is 0.8 μs.

13. The method of claim 1 wherein Q is 1.

14. The method of claim 1 wherein the step of determining the first correlation metric includes using a correlation length between the received data packet and the time-shifted data packet equal to a full preamble length of the data packet having a first preamble period minus M times the second preamble period.

15. The method of claim 1 further comprising the step of causing a wireless transmitter to cease or be prevented from transmission.

16. A wireless receiver comprising:

an input for receiving receive wireless signals of a first protocol designed for communicating data packets having a first preamble period and receiving wireless signals of a second protocol designed for communicating data packets having a second preamble period which is N times the first preamble period, where N is a positive integer;

a time-shifter for generating a first time-shifted data packet with respect to a received data packet by a first time shift equal to M times the second preamble period, where M is a non-zero integer;

a correlator for determining a first correlation metric based on the received data packet and the time-shifted data packet; and one or more processor for determining whether the undetermined protocol is the first protocol or the second protocol, based on the first correlation metric, the determining comprising:

generating a second time-shifted data packet with respect to the received packet by a second time shift equal to Q times the first preamble period, where Q is a non-zero integer and is not an integer multiple of N;

determining a second correlation metric based on the received data packet and the second time-shifted data packet; and determining whether the undetermined protocol is the first protocol or the second protocol based on the second correlation metric.

17. The wireless receiver of claim 16 further comprising a decoder for decoding the data packets having the first preamble period.

18. A non-transitory machine-readable medium comprising machine-readable instructions which on execution by a processor cause a wireless receiver configured to:

receive wireless signals of a first protocol designed for communicating data packets having a first preamble period; and receive wireless signals of a second protocol designed for communicating data packets having a second preamble period which is N times the first preamble period, where N is a positive integer, to execute the steps of:

receiving a wireless signal of an undetermined protocol, the wireless signal carrying a data packet;

generating a first time-shifted data packet with respect to the received data packet by a first time shift equal to M times the second preamble period, where M is a non-zero integer;

determining a first correlation metric based on the received data packet and the first time-shifted data packet, and determining whether the undetermined protocol is the first protocol or the second protocol, based on the first correlation metric, the determining comprising:

generating a second time-shifted data packet with respect to the received packet by a second time shift equal to Q times the first preamble period, where Q is a non-zero integer and is not an integer multiple of N;

determining a second correlation metric based on the received data packet and the second time-shifted data packet; and determining whether the undetermined protocol is the first protocol or the second protocol based on the second correlation metric.

* * * * *